April 29, 1969    H. K. GRAHAM    3,441,175
METERING MACHINE FOR POULTRY INSEMINATION
Filed April 21, 1967                                    Sheet 1 of 3
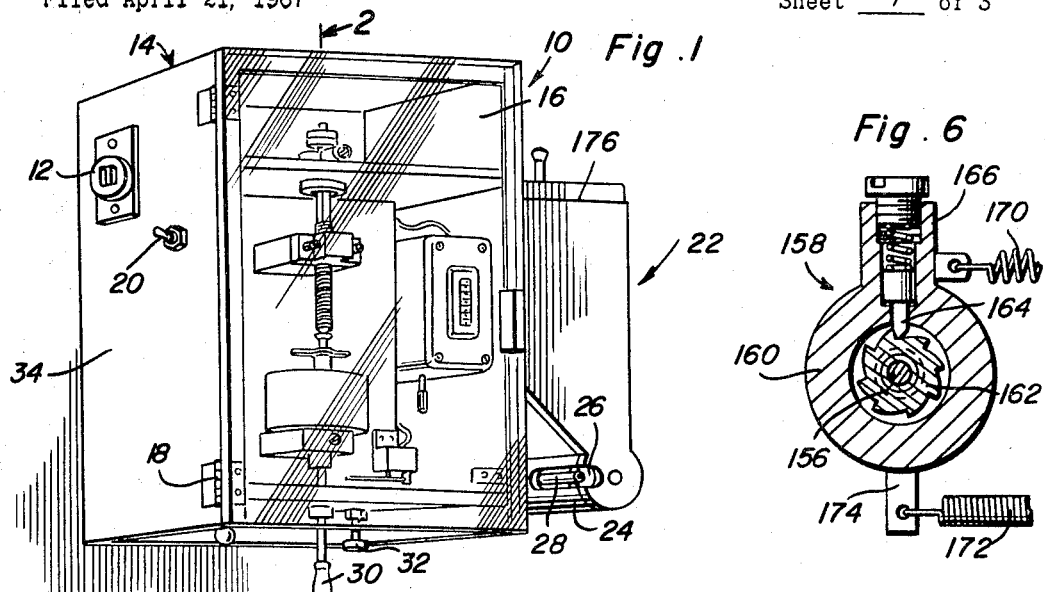
Fig. 1
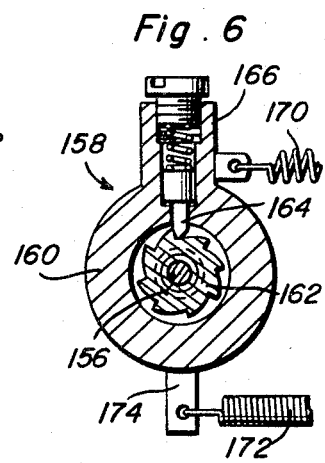
Fig. 6
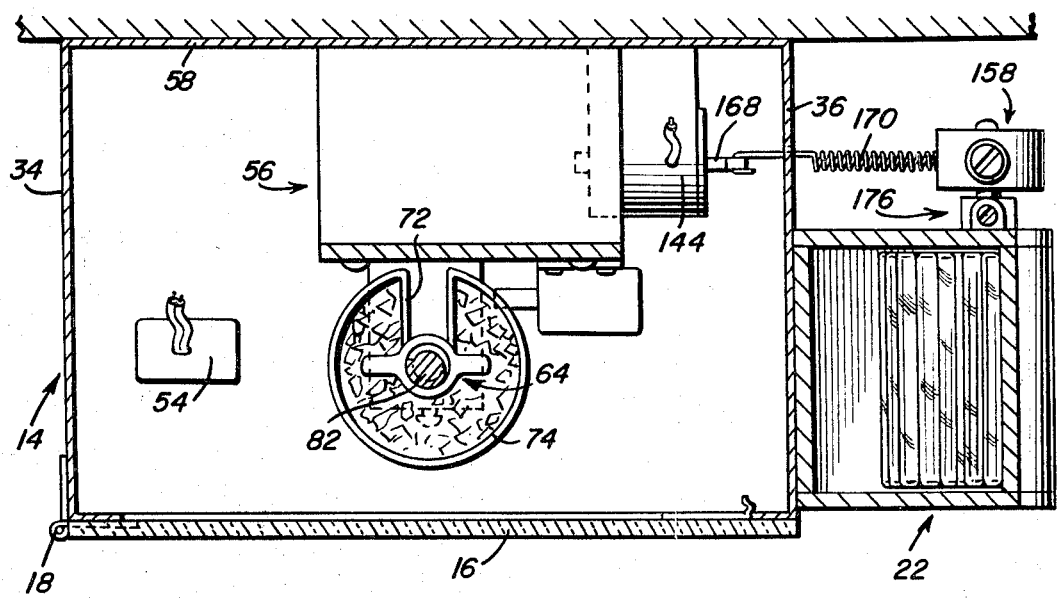
Fig. 4
Fig. 5
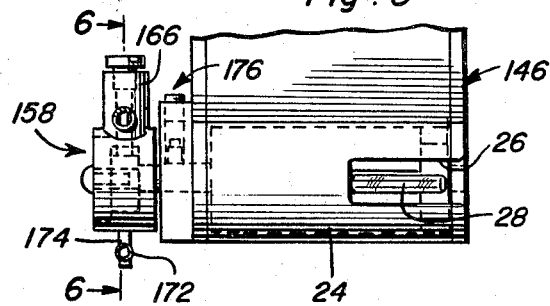
Homer K. Graham
INVENTOR.
BY Clarence A. O'Brien
and Harvey B. Jacobson
Attorneys

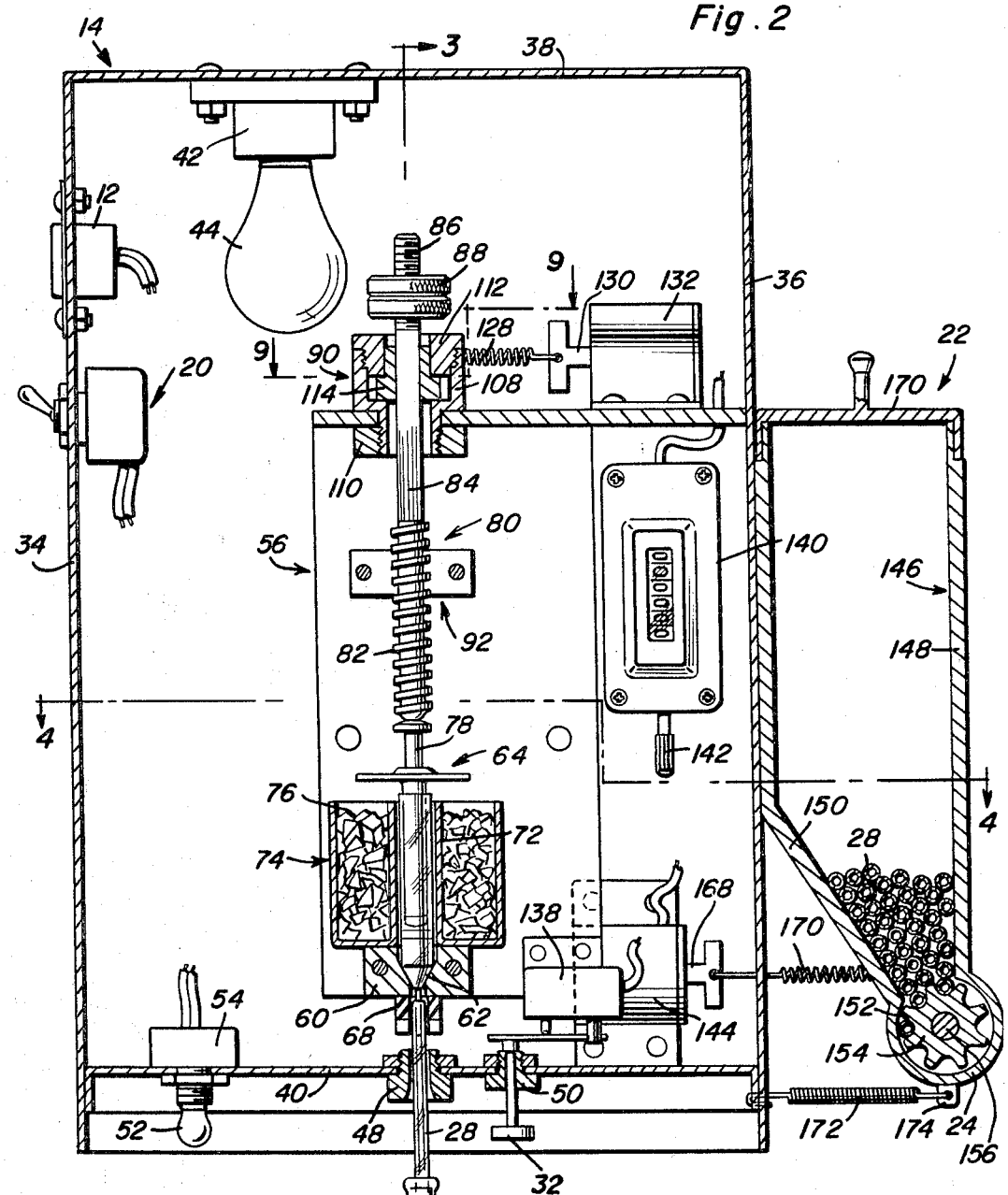
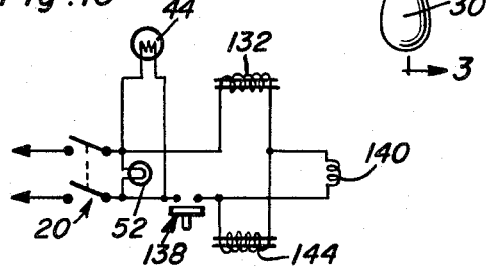

April 29, 1969

H. K. GRAHAM 3,441,175

METERING MACHINE FOR POULTRY INSEMINATION

Filed April 21, 1967

Homer K. Graham
INVENTOR.

BY Clarence A. O'Brien
and Harvey B. Jacobson
Attorneys

United States Patent Office 3,441,175
Patented Apr. 29, 1969

3,441,175
METERING MACHINE FOR POULTRY INSEMINATION
Homer K. Graham, 10718 E. 13th St., Independence, Mo. 64052
Filed Apr. 21, 1967, Ser. No. 632,587
Int. Cl. A47f 1/10; G01f 11/02; B67d 5/62
U.S. Cl. 221—96                                    16 Claims

ABSTRACT OF THE DISCLOSURE

A machine for metering exact quantities of seminal fluid discharged from a syringe into a straw or tube through which fluid is injected into the egg sacs of poultry for artificial insemination purposes. Several charges of seminal fluid are maintained within the syringe at the proper temperature inside of the machine cabinet. Each charge of fluid dispensed is counted and a new straw automatically dispensed from a storage container each time the metered charge of seminal fluid is discharged from the machine.

BACKGROUND OF THE INVENTION

This invention relates to the storing, and dispensing of metered quantities of seminal fluid and injecting straws utilized in poultry insemination.

Artifical poultry insemination involves the collection of seminal fluid from male birds and injecting such fluid into the egg sacs of the female birds when desired. One of the problems in this procedure, is the measurement of exact quantities of seminal fluid necessary to obtain a high degree of egg fertilization. Such measurement is generally accomplished manually which is both inexact and time consuming. Further, in metering the seminal fluid, there is a problem in maintaining the fluid at the proper temperature and under sterile conditions.

In one of the methods of practicing artificial insemination of poultry, the seminal fluid is collected within a syringe from which predetermined quantities are discharged into capillary tubes or straws through which the seminal fluid is injected into the egg sac of the female bird. Two persons are often needed to insert the needle of the syringe into one end of the straw, visually meter the quantity of seminal fluid discharged into the straw, and inject the fluid from the straw into the egg sac. Also, because of the handling of both the syringe and the straws, it is rather difficult to maintain the seminal fluid at the proper temperature and under the requisite sterile conditions.

SUMMARY OF THE INVENTION

In accordance with the present invention, a machine is provided whereby a syringe filled with seminal fluid may be stored under proper temperature conditions and automatically operated without any manual handling so as to discharge an exact quantity of seminal fluid into straws inserted into the machine, the straws being also automatically dispensed each time a charge of fluid is dispensed so as to reduce contamination.

An important feature of the present invention therefore is to provide a machine through which predetermined charges of seminal fluid may be more accurately metered and dispensed into the straws without any handling of the syringe and with a minimum handling of the straws. Each charge of fluid dispensed is also counted so that the operator may know when the syringe must be reloaded with seminal fluid.

Yet another feature of the present invention is to provide a fluid metering device within which a fluid containing syringe is positioned in heat exchange relation with a cooling tank having a guide slot aligning the syringe with a guide through which a straw is inserted so as to receive the needle of the syringe in order to accept a charge of seminal fluid from the syringe. A solenoid operated ratchet mechanism advances a screw shaft engaged with the syringe plunger, by a fixed incremental amount in order to dispense an exact quantity of fluid from the syringe each time the solenoid is pulsed under selective control of an operator actuated microswitch. Each pulse is counted by an electrical counter to indicate the quantity of fluid remaining in the syringe. The straw dispenser is also rendered operative simultaneously with the solenoid operated, screw advancing mechanism in order to convey and expose only a single straw at a time in the dispenser outlet.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIGURE 1 is a perspective view showing the machine of the present invention.

FIGURE 2 is a front sectional view of the machine as viewed through a plane indicated by section line 2—2 in FIGURE 1.

FIGURE 4 is a top sectional view taken substantially through a plane indicated by section line 4—4 in FIGURE 2.

FIGURE 5 is a partial side elevational view of the bottom of the straw dispenser associated with the machine.

FIGURE 6 is an enlarged partial sectional view taken substantially through a plane indicated by section line 6—6 in FIGURE 5.

FIGURE 10 is a simplified electrical circuit diagram associated with the machine.

DESCRIPTION OF THE PREFERRED EMBODIMENT

Figure 3:
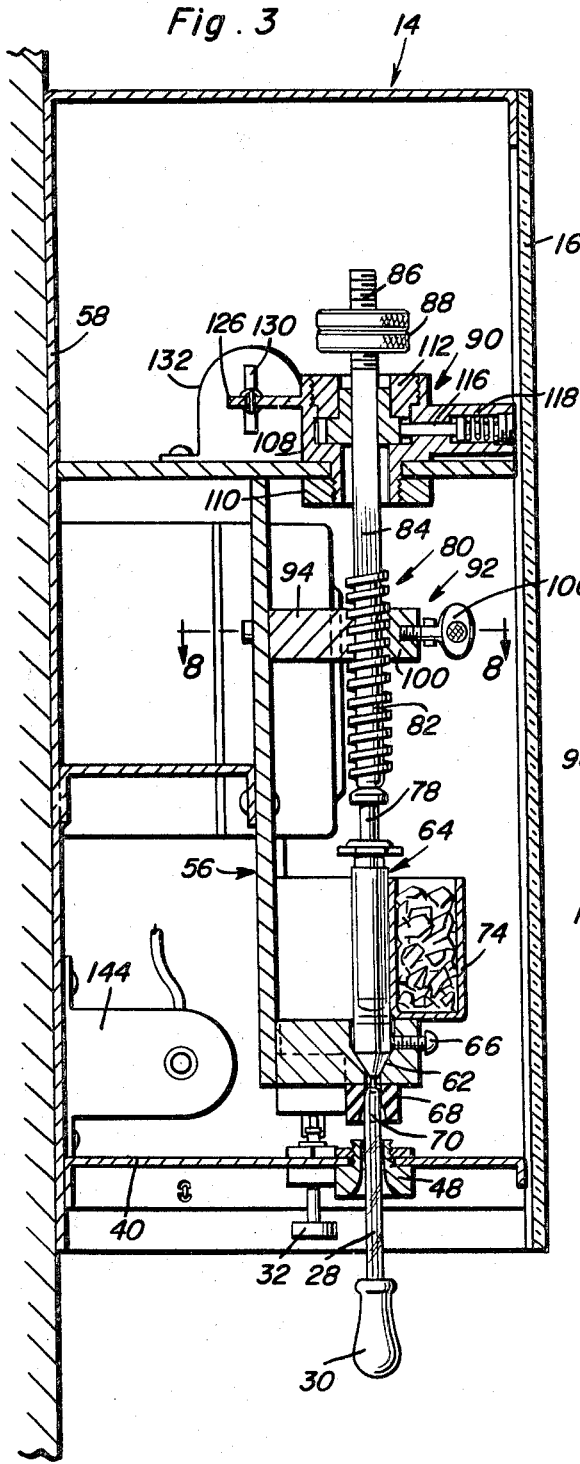
FIGURE 3 is a transverse sectional view taken substantially through a plane indicated by section line 3—3 in FIGURE 2.
Figure 7:
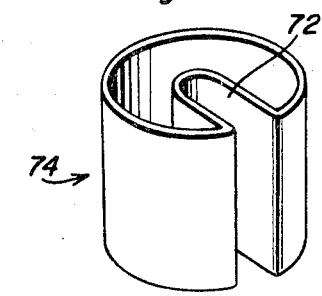
FIGURE 7 is a perspective view of the cooling tank associated with the machine.

Referring now to the drawings in detail, FIGURE 1 illustrates the machine generally denoted by reference numeral 10, mounted for example on a vertical wall. The machine is electrically operated and toward this end electrical energy is brought thereto by a 110 v. AC power cable plugged into the power inlet receptacle 12 mounted by a cabinet 14 having an open front closed by a transparent closure panel 16 hinged to the cabinet by the hinges 18 for example. An on-off toggle switch 20 is also mounted by the cabinet adjacent to the power receptacle 12. Further, the cabinet mounts a straw dispenser generally referred to by reference numeral 22 having a lower cylindrical end portion 24 provided with an outlet slot 26 through which plastic straws or injection tubes 28 are exposed for withdrawal. A poley bulb 30 is applied to one end of a straw 28 when removed from the dispenser, the other end of the straw being then inserted into the bottom of the cabinet 14 so as to receive a charge of seminal fluid. The charge of fluid is dispensed when an actuator knob 32 projecting from the bottom of the cabinet is upwardly displaced by the operator. The straw may then be withdrawn from the cabinet with the charge of seminal fluid therein. The machine will then be ready for dispensing another charge of seminal fluid.

Referring now to FIGURES 2, 3 and 4 in particular, it will be observed that the cabinet 14 includes the side walls 34 and 36, interconnected by the top wall 38 and a recessed bottom wall 40. The side wall 34 mounts the power receptacle 12 and the toggle switch 20 aforementioned while the straw dispenser 22 is secured in any suitable fashion to the side wall 36. Mounted on the top wall 38, is a lamp base 42 adapted to receive the lamp bulb 44 from which both heat and illumination is provided for the interior of the cabinet. The bottom wall 40 mounts a guide 48 through which the straw 28 is inserted. Also mounted on the bottom wall adjacent to the guide 48, is the fitting 50 which slidably mounts the actuator knob 32. A pilot lamp bulb 52 is received within a lamp socket 54 secured to the bottom wall 40 so as to illuminate the bottom area of the machine whenever power is connected thereto. The operating parts of the machine within the cabinet 14, are mounted by a frame assembly 56 secured to the back wall 58 associated with the cabinet against the side wall 36. The operating parts of the machine are visible and readily accessible through the transparent closure panel 16. Operation of the machine may also be monitored and parts replaced when needed by opening of the closure panel.

The frame assembly 56 fixedly mounts a retainer block 60 having a conical cavity 62 within which the lower end of a conventional syringe 64 is seated and held in position by means of a setscrew 66 as shown in FIGURE 3. The cavity 62 is axially aligned with a guide bore formed in the guide collar 68 secured to the bottom of the retainer block which in turn is axially aligned with the guide 48 aforementioned so as to receive the straw 28. The needle 70 of the syringe extends into the guide collar 68 so that it may be received within the straw as illustrated in FIGURES 2 and 3. The body of the syringe 64 on the other hand is maintained in axial alignment with the straw by means of a guide slot 72 formed in a cooling tank 74 seated on the retainer block 60. It will be apparent therefore, that the cooling tank may be slidably removed or inserted into the cabinet in enclosing relation to the syringe 64. A cooling medium such as ice 76 may be carried within the cooling tank in heat exchange relation with the seminal fluid collected within the syringe in order to maintain the fluid at the proper temperature.

The plunger 78 of the syringe is adapted to be engaged by the lower end of an actuating shaft 80 having a lower, externally threaded screw section 82 and an intermediate non-circular slide section 84. The actuating shaft is provided with a circular threaded portion 86 at its upper end for mounting the internally threaded stop nut 88 in an axially adjusted position. The stop nut 88 is thereby adapted to be limit the axial travel of the actuating shaft 80 by abutting the power operated ratchet mechanism 90 through which the actuating shaft is incrementally rotated in order to cause axial advancement of the shaft by virtue of its threaded engagement with the nut assembly 92 secured to the frame 56.

Figure 8:
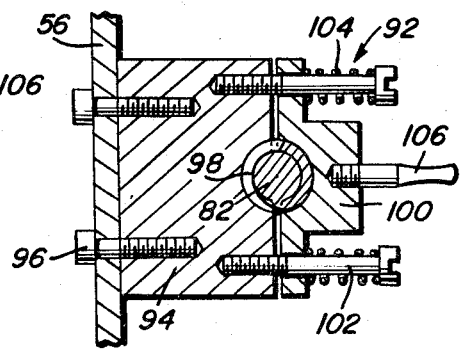
FIGURE 8 is a partial sectional view taken substantially through a plane indicated by section line 8—8 in FIGURE 3.

As more clearly seen in FIGURE 8, the nut assembly 92 includes a fixed section 94 secured by the fasteners 96 to the frame and provided with a semi-circular, internally threaded recess 98 in threaded engagement with the screw section 82 of the actuating shaft. A releasable nut section 100 is slidably mounted by the bolts 102 extending from the fixed section 94 and urged by the springs 104 into threaded engagement with the screw section 82 of the actuating shaft so as to cooperate with the fixed nut section 94 and cause axial advancement of the shaft assembly when rotated. In order to axially withdraw the actuating shaft from the plunger of the syringe or bring the shaft into engagement with the syringe plunger, the releasable nut section 100 is withdrawn from threaded engagement with the actuating shaft by means of the knob 106 against the bias of the springs 104.

Figure 9:
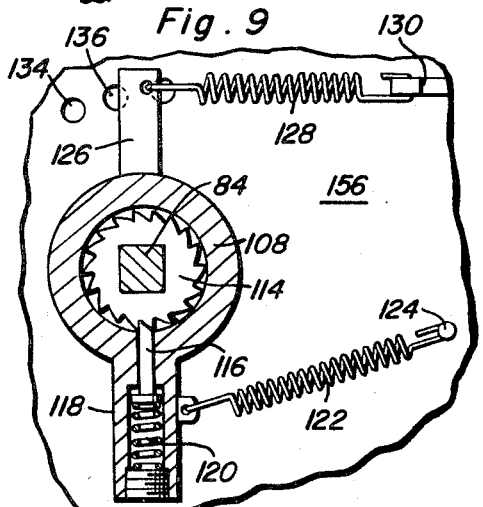
FIGURE 9 is a partial sectional view taken substantially through a plane indicated by section line 9—9 in FIGURE 2.

The ratchet mechanism 90 includes a tubular member 108 rotatably mounted by the frame 56 and held assembled thereon by means of the nut 110 as shown in FIGURES 2 and 3. Rotatably mounted within the tubular member 108 and held assembled therein by means of the assembly nut 112, is a ratchet wheel 114. The non-circular section 84 of the actuating shaft slidably extends through the ratchet wheel 114 so that rotation of the ratchet wheel may be transmitted to the actuating shaft while permitting it to be axially displaced relative to the ratchet wheel. A pawl element 116 is slidably mounted by the tubular member 108 within a radial extension 118 thereof as more clearly seen in FIGURE 9. A spring 120 is enclosed within the tubular extension 118 and biases the pawl element 116 into engagement with the ratchet teeth on the ratchet wheel 114 so that angular displacement of the tubular element in one direction only will angularly displace the ratchet wheel, the pawl element overrunning the ratchet teeth in the other direction. The tubular member is yieldably biased to one angular position by means of a return spring 122 the opposite ends of which are respectively connected to the tubular extension 118 and an anchor 124 fixed to the frame. The tubular member is also provided with a drive arm 126 connected by a force transmitting spring 128 to the armature 130 of an electrically operated metering solenoid 132 fixed to the frame. It will be apparent therefore, that when the solenoid 132 is pulsed, it will angularly displace the tubular member 108 in a clockwise direction as viewed in FIGURE 9 transmitting angular displacement through the pawl element 116 to the ratchet wheel 114. When the solenoid is deenergized, the tubular member is returned by means of the spring 122 to its opposite angular position. The oscillatory stroke of the tubular member 108 is determined by means of a stop pin 134 received within one of a plurality of stroke adjusting holes 136 formed in the frame for this purpose. It will be apparent therefore, that each time the solenoid 132 is pulsed, the ratchet wheel 114 will be incrementally rotated by a fixed amount producing a fixed amount of axial movement of the actuating shaft 80 causing a corresponding discharge of a fixed quantity of seminal fluid from the syringe 64 into the straw 28.

The solenoid 132 is pulsed each time the actuating knob 32 is displaced upwardly to momentarily close the microswitch 138 fixedly mounted by the frame adjacent the bottom wall 40 as shown in FIGURE 2. Further, each time the solenoid 132 is pulsed by current conducted thereto through the microswitch device 138, the pulse is registered on a counter 140 visible through the transparent closure panel 16 of the cabinet. The counter is provided with a reset knob 142 capable of being manipulated by the operator upon opening of the cabinet. Also energized at the same time that the solenoid 132 is pulsed, is a second solenoid device 144 fixedly mounted on the back wall 58 adjacent the bottom wall 40 in order to operate the straw dispenser 22.

The straw dispenser includes a storage container 146 having a vertical wall 148 spaced from the side wall 36 of the cabinet 14 and an opposite wall secured to the side wall of the cabinet provided with a lower inclined portion 150 converging toward the cylindrical outlet portion 24 of the dispenser. The straws 28 stored within the container will therefore drop into the exposed, axially extending grooves 152 formed in a dispensing rotor 154. The rotor 154 is therefore rotatably mounted within the lower cylindrical portion 24 of the dispenser and is provided with a drive shaft 156. The shaft 156 extends axially from one end of the cylindrical portion 24 opposite the end at which the slot 26 is formed as shown in FIGURE 5. A ratchet drive mechanism 158 is accordingly connected to the shaft 156 in order to incrementally rotate the rotor 154 so as to transfer a groove 152 to the outlet slot 26 carrying a single straw therewith. It will be apparent therefore, that a single new straw is presented to the outlet slot 26 in the dispenser each time a charge of seminal fluid is dispensed.

As more clearly seen in FIGURE 6, the ratchet mechanism 158 includes a tubular member 160 rotatably mounted about the shaft 156 enclosing a ratchet wheel 162 secured to the shaft. A spring-biased pawl element 164 is slidably mounted by the tubular member 160 within the radial extension 166 thereof to which the armature 168 of solenoid device 144 is connected by means of the spring 170. Also, a return spring 172 is anchored at opposite axial ends to the cabinet 14 and an arm 174 projecting from the tubular member 160. The ratchet mechanism 158 is therefore operated in response to pulsing of the solenoid 144 as hereinbefore described in connection with the ratchet mechanism 90. Further, a one-way ratchet brake mechanism 176 is mounted by the dispenser mechanism about the drive shaft 156 as shown in FIGURE 5 in order to prevent reverse rotation of the dispenser rotor 154. Thus, the straws 28 will be dispensed from the dispenser mechanism one at a time and will be stored therewithin in a sterile condition. The dispenser container 146 may be refilled with straws through its upper end closed by the closure 176.

From the foregoing description, the construction and operation of the apparatus of the present invention will be apparent. Upon closing of the toggle switch 20, an electrical circuit is completed through the lamps 44 and 52 as shown in the electrical circuit diagram of FIGURE 10. The interior of the cabinet 14 is thereby illuminated and maintained at a proper temperature to prevent freeze-up for example. Seminal fluid collected within a syringe such as the syringe 64, may then be inserted and held in position within the cabinet by means of the retainer block 60 and the cooling tank 74. Before the syringe is inserted, the actuating shaft 80 is retracted upwardly by release of the nut assembly 92 as aforementioned. The actuating shaft may then be brought into engagement with the plunger 78 of the syringe and the knob 106 of the nut assembly released so that any subsequent rotation of the shaft by the ratchet mechanism 90 will axially advance the shaft downwardly to displace the plunger 78 of the syringe discharging a quantity of fluid from the syringe. A straw 28 withdrawn from the dispenser 22 is however inserted through the guide 48 before any charge of seminal fluid is discharged from the syringe. Fluid is discharged upon upward displacement of the actuator knob 32 closing the microswitch 38 so as to pulse the solenoid 132 by completing a circuit therethrough as shown in FIGURE 10. At the same time, the solenoid 144 is pulsed as well as the actuating coil of the counter 140. When the solenoid 132 is pulsed, the ratchet mechanism 90 angularly rotates the actuating shaft 80 by a predetermined amount so as to cause a predetermined axial advancement of the actuating shaft and discharge of an exact quantity of seminal fluid from the syringe. The pulse is also counted by the counter 140 while the simultaneous pulsing of the solenoid 144 conveys a single straw 28 to the outlet slot 26 of the dispenser for subsequent withdrawal thereof by the operator. In order to prevent damage to the syringe from excessive downward displacement of the plunger 78, travel of the actuating shaft 80 is limited by the adjustable stop nut 88. Further, the quantity of fluid dispensed and the angular stroke of the ratchet mechanism 90 may be adjusted by repositioning the stroke limiting stop pin 134. The number of charges of seminal fluid dispensed is monitored by the counter 140 which may be reset each time the syringe is reloaded. Reloading of the syringe as well as the cooling tank 74 is easily effected upon opening of the transparent closure panel 16 through which operation may at all times be monitored.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for dispensing liquid from a syringe into tubes comprising: a cabinet, temperature regulating means for heating and illuminating the cabinet interiorly thereof, a container mounted on said cabinet storing said tubes therein, said container having an outlet from which said tubes are withdrawn, means for positioning the syringe within the cabinet, guide means mounted by the cabinet for removably receiving a tube in operative relation to the syringe, selectively controlled actuating means engageable with the syringe within the cabinet for displacing a predetermined quantity of said liquid into the tube, and dispensing means rendered operative in response to said displacement of liquid from the syringe for moving the tubes one at a time into the outlet.

2. The combination of claim 1 wherein said positioning means for the syringe includes a tank having a slot within which the syringe is received, a retainer fixedly mounted in the cabinet on which the tank and the syringe are seated in axial alignment with the guide means, said tank containing a cooling medium in heat exchange relation with the liquid within the syringe.

3. The combination of claim 2 wherein said actuating means includes an actuating shaft engageable with the syringe, power operated means for incrementally advancing the shaft in an axial direction, control means connected to the power operated means for selectively advancing said shaft by a fixed amount, and means for limiting axial travel of the shaft.

4. The combination of claim 3 including counter means connected to the control means for registering the number of times the shaft is incrementally advanced by said fixed amount.

5. A device for dispensing liquid from a syringe into tubes comprising: a cabinet, means for positioning the syringe within the cabinet, guide means mounted by the cabinet for removably receiving a tube in operative relation to the syringe, selectively controlled actuating means engageable with the syringe within the cabinet for displacing a predetermined quantity of said liquid into the tube, said actuating means including an actuating shaft engageable with the syringe, power operated means for incrementally advancing the shaft in an axial direction, control means connected to the power operated means for selectively advancing said shaft by a fixed amount, means for limiting axial travel of the shaft, said power operated means including a metering solenoid, one-way ratchet means operatively connected to the solenoid and slidably mounting the shaft for incrementally rotating the same in response to pulsing of the solenoid and a nut assembly mounted by the cabinet in threaded engagement with said shaft for axial advancement thereof in response to said rotation of the shaft by the ratchet means.

6. The combination of claim 5 wherein said nut assembly includes a fixed section, a disengageable section slidably mounted by the fixed section in enclosing relation to the shaft and yieldable means releasably clamping the shaft in threaded engagement between said sections.

7. The combination of claim 6 wherein said dispensing means includes, a rotor having circumferentially spaced grooves, each conveying a single tube from the container to the outlet, and power operated ratchet means for incrementally rotating said rotor for advancing each groove to the outlet.

8. The combination of claim 1 wherein said positioning means for the syringe includes a tank having a slot within which the syringe is received, a retainer fixedly mounted in the cabinet on which the tank and the syringe are seated in axial alignment with the guide means, said tank containing a cooling medium in heat exchange relation with the liquid within the syringe.

9. The combination of claim 8 including temperature regulating means for heating and illuminating the cabinet interiorly thereof.

10. The combination of claim 1 wherein said dispensing means comprises a rotor having circumferentially spaced grooves, each conveying a single tube from the container to the outlet, and power operated ratchet means for incrementally rotating said rotor for advancing each groove to the outlet.

11. The combination of claim 1 wherein said actuating means includes an actuating shaft engageable with the syringe, power operated means for incrementally advancing the shaft in an axial direction, control means connected to the power operated means for selectively advancing said shaft by a fixed amount, and means for limiting axial travel of the shaft.

12. A device for dispensing liquid from a syringe into tubes comprising: a cabinet, means for positioning the syringe within the cabinet, guide means mounted by the cabinet for removably receiving a tube in operative relation to the syringe, selectively controlled actuating means engageable with the syringe within the cabinet for displacing a predetermined quantity of said liquid into the tube, said actuating means including an actuating shaft engageable with the syringe, power operated means for incrementally advancing the shaft in an axial direction, control means connected to the power operated means for selectively advancing said shaft by a fixed amount, means for limiting axial travel of the shaft, said power operating means including a metering solenoid, one-way ratchet means operatively connected to the solenoid and slidably mounting the shaft for incrementally rotating the same in response to pulsing of the solenoid and a nut assembly mounted by the cabinet in threaded engagement with said shaft for axial advancement thereof in response to said rotation of the shaft by the ratchet means.

13. The combination of claim 12 wherein said nut assembly includes a fixed section, a disengageable section slidably mounted by the fixed section in enclosing relation to the shaft and yieldable means releasably clamping the shaft in threaded engagement between said sections.

14. The combination of claim 13 including counter means connected to the control means for registering the number of times the shaft is incrementally advanced by said fixed amount.

15. A device for dispensing liquid from a syringe into straws comprising a cabinet, an annular tank having a slot through which the syringe extends, a retainer member fixedly mounted within the cabinet on which the tank is seated and to which the syringe is secured, a screw shaft engageable with the syringe, nut means mounted within the cabinet axially spaced from the tank for threadedly mounting the screw shaft, ratchet means slidably connected to the screw shaft for rotation thereof by incremental amounts to axially advance the screw shaft, stop means secured in an adjusted position to the screw shaft for engagement with the ratchet means to limit travel of the screw shaft, storage means mounted on the cabinet, means for dispensing straws one at a time from the storage means, solenoid means for simultaneously rendering the ratchet means and the dispensing means operative and switch control means connected to the solenoid means for energization thereof.

16. The combination of claim 15 including counter means connected to the solenoid means for counting the number of pulses applied thereto through the switch control means.

References Cited

UNITED STATES PATENTS

| | | | |
|---|---|---|---|
| 755,723 | 3/1904 | Taylor | 222—146 X |
| 1,761,875 | 6/1930 | Cordell et al. | 222—327 X |
| 1,858,758 | 5/1932 | Wolfe | 221—96 |
| 2,524,673 | 10/1950 | Martin | 221—266 X |
| 2,562,212 | 7/1951 | Rogers et al. | 222—113 |
| 2,715,991 | 8/1955 | Frank et al. | 222—390 X |
| 2,913,151 | 11/1959 | Wiseman et al. | 222—327 X |
| 2,966,175 | 12/1960 | Hyde | 222—390 X |
| 3,336,925 | 8/1967 | Thompson | 222—390 X |

SAMUEL F. COLEMAN, *Primary Examiner.*

U.S. Cl. X.R.

222—146, 327, 390